United States Patent Office 3,076,683
Patented Feb. 5, 1963

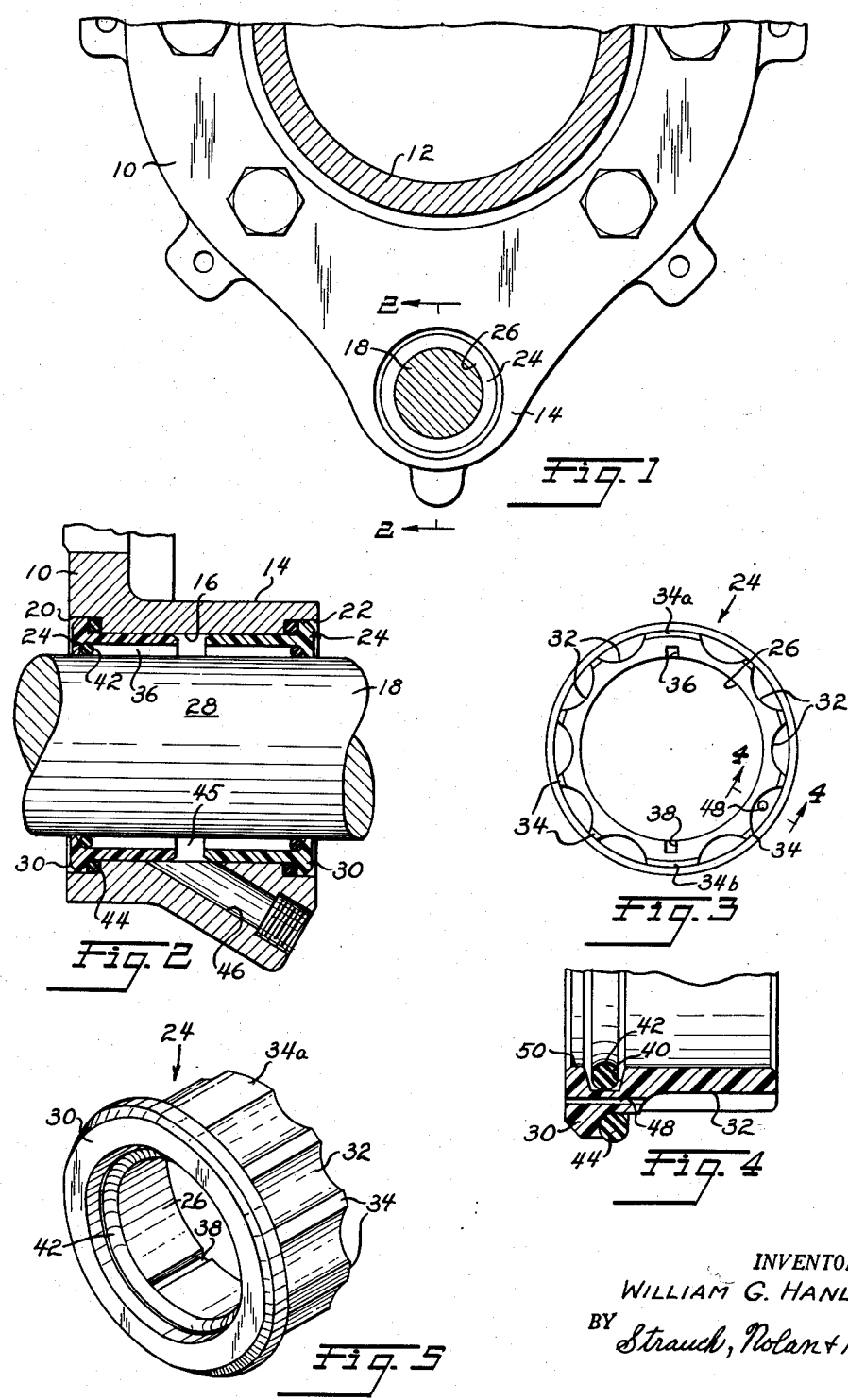

3,076,683
BRAKE CAMSHAFT MOUNTING
William G. Hanley, Kenton, Ohio, assignor to Rockwell-Standard Corporation, Coraopolis, Pa., a corporation of Pennsylvania
Filed Feb. 5, 1960, Ser. No. 7,007
7 Claims. (Cl. 308—36.1)

The present invention relates to low friction bearings for mounting a rotatable shaft and more especially to a self-sealing, non-metallic, plastic bushing particularly adapted for use in a brake camshaft assembly in automotive vehicle brakes.

In automotive brakes, the cam and camshaft support are usually formed into a rigid unit with spaced bearing surfaces for the camshaft ends, the camshaft being journalled on either needle bearings or bushings supported respectively in the brake mounting plate or spider at the the actuating end and in a spaced bracket at the chamber support end. A brake assembly of this general type is shown for example in United States Patent 2,892,662.

In prior constructions employing metal antifriction bearings or bushings difficulties in operation and maintenance have been encountered due to rust and corrosion under adverse operating conditions or when lubrication was neglected. Because of limited angular movement of the camshaft (always less than 360°) the antifriction bearings eventually gall on the camshaft and the needles or rollers flatten out after prolonged actuation. This condition accounts consequently for misalignment of the camshaft resulting in insufficient brake actuation. These difficulties increase in automotive vehicles traveling frequently in heavy traffic or on hilly terrain where a lot of braking has to be done and also in vehicles carrying heavy loads.

To overcome those obstacles bushings made of synthetic plastic material, such as nylon, Teflon or other well known products have recently come into widespread use. Those materials are not adversely affected by oil, grease, water, acids, and other liquids and are in general thermally stable so as to be operable under all weather conditions. Narrow longitudinal or diagonal slots may be provided to split the bushing along its length to compensate for heat expansion or contraction and grooves may be cut in the inner surface to allow sufficient lubricant circulation. Those materials can easily be formed or pressed and machined. However, with this type plain bushing felt seals had to be used on the outer ends of the bushing housings to prevent lubricant from leaking out and to keep out dust, dirt, moisture and other foreign matters. Those felt seals have been found inadequate in that they could not be precision made and as a result water (or salt in winter) enters the bushing housing which accounts for corrosion and rust on the camshaft and consequent seizing of the bushing. A further disadvantage lay in the necessary use of a straight grease fitting to permit grease to enter the spider bushing housing. During lubrication the grease frequently poured around the felt seals and entered the brake drum. Those prior plain bushings of synthetic material frequently seized on the camshaft by over-expansion during excessive heat accumulation, even if a compensation gap was provided. In some cases they tended to travel longitudinally in their supports (brake spider or fluid chamber bracket) when the bushing contracted in cold weather.

Those and other disadvantages of prior plastic shaft supporting bushings have been overcome by the present invention which provides a novel synthetic plastic bushing to rotatively support a shaft which is self-sealing and does under no condition seize on the shaft and which in some instances does not have to be lubricated.

Accordingly, it is the main object of the present invention to provide a novel shaft supporting bushing made of tough, corrosion resistant, non-metallic material which does not, as a rule, require lubrication and which is self-sealing to exclude foreign matters from the assembly and to retain lubricant when lubricated.

A further object of the present invention is to provide in a tough, corrosion resistant, non-metallic bushing outer and inner resilient seal rings of normally circular cross-section to retain lubricant and to exclude dirt, fluids, and other foreign matter from the journal assembly.

It is also an important object of the invention to provide a novel self-sealing non-metallic bushing assembly comprising a pair of bushing units, the inner ends of which are spaced to provide a lubricant chamber.

A still further object of the present invention is to provide a non-metallic bushing made of the commercially available synthetic polymers such as Lexan or Delrin.

Still another object of the present invention is to provide a novel brake camshaft bushing of plastic material having a smooth cylindrical bore and two opposite slots cut therein longitudinally to prevent seizing of the bushing on the shaft.

Other objects and novel features will become apparent by the following description taken in connection with the appended drawings in which:

FIGURE 1 is a fragmentary view showing the lower half of a brake supporting spider with the camshaft and novel bushing journalled therein;

FIGURE 2 is an enlarged longitudinal cross-section through the camshaft support of the brake spider along the line 2—2 of FIGURE 1;

FIGURE 3 is an end view of one of the novel bushings of FIGURE 2 removed from the assembly;

FIGURE 4 is an enlarged fragmentary section through the wall of the novel bushing along line 4—4 of FIGURE 3; and FIGURE 5 is a perspective view of the novel bushing removed from the assembly.

With reference to the drawing there is shown in FIGURE 1 the lower half of a brake supporting spider 10 welded or otherwise secured to an axle housing 12 to provide the usual support for any known cam actuated brake mechanism. Brake spider 10 is provided with an outwardly extending boss portion 14 (FIGURE 2) having a cylindrical through bore 16. Boss portion 14 provides support for a brake camshaft 18 extending therethrough and which is provided at the spider end with the usual cam (not shown) and at the opposite end carries a brake lever (not shown). When the brake lever is actuated, camshaft 18 and the cam are rotated to spread opposed brake shoes pivotally supported on the brake spider 10 apart against a rotating wheel supported brake drum. The structure thus far described is well known in vehicle brake mechanism of this kind and is shown for example in United States Patent No. 2,755,890 and, therefore, need not be illustrated or further described. The other end of the camshaft 18 may be supported in a camshaft bracket as for instance that disclosed in United States Letters Patent No. 2,923,579 issued February 2, 1960.

To facilitate rotation of the camshaft and to provide sufficient alignment and stability, the camshaft is journalled at both ends in bearings or bushings. The present invention is primarily concerned with the illustrated brake spider journal.

The bore 16 of the brake spider boss 14 is provided at both ends with counterbores 20 and 22 which formerly received conventional felt seals to seal the journal assembly.

In the present invention novel bushings 24 are inserted in bore 16 from both ends thereof to rotatably support camshaft 18.

Since the bushings are identical it will suffice to describe only one of them.

The novel bushing 24 is molded or otherwise formed out of tough, corrosion resistant, non-metallic synthetic polymers such as Lexan or Delrin and provides a generally smooth cylindrical through bore 26 (FIGURE 3) which closely surrounds the bearing surface 28 of camshaft 18. The bushing 24 is provided at one end with an outwardly projecting circumferential flange 30 having an outer diameter which closely fits into the inner diameter of the counterbores 20 or 22. Adjacent the flange 30 and extending longitudinally to the opposite end of the bushing are a number of semicircular equally spaced cavities 32 leaving land sections 34 between them, as best shown in FIGURE 5. The cavities 32 are provided to reduce the weight and amount of material for this bushing to save cost without weakening the structure. They may also be used as lubricant retaining pockets in instances where lubrication is required. Land sections 34 provide a close press-fit in bore 16.

These lands and cavities define a fluted outer surface section between the narrow annular region underlying O-ring 44 and the end of the body opposite the flange 30.

It will be noted in FIGURES 3 and 5 that two opposite land sections 34a and 34b have a larger area than the other adjacent land sections 34. The larger cross-sectional area at these points provides enough material for the internal longitudinally extending grooves 36 and 38 cut in the internal surface of the bushing to prevent the bushing from seizing on the shaft during prolonged operation, and which also aid in lubricating the bearing surface 28 of camshaft 18. The grooves allow the inner surface fibers of the plastic material of the bushing to contract or expand freely during temperature changes without seizing on the shaft. The grooves 36 and 38 extend from the inner end of the bushing 24 to an internal circumferential groove 40 near the outer end of the bushing. Mounted in the groove 40 is an inner resilient O-ring seal 42 of normally circular cross-section, as best shown in FIGURE 4, which becomes slightly depressed by the inserted camshaft 18 to provide a tight seal on the latter. A similar O-ring seal 44 is placed adjacent the inner side of the flange 30 around the outer diameter of the bushing 24 to provide a tight seal between the flange 30 and the shoulders of the counterbores 20 or 22.

The flange 30 not only acts as a seal retaining means but also as an abutment to prevent the two bushings from coming together. Conventional plain plastic bushings contract in cold weather and have a tendency to travel in their housing. The flange 30 on the present novel bushing 24 prevents this.

It will be noted from FIGURE 2 that there remains a small space 45 between the inner ends of the bushings 24 which may, together with the cavities 32, be filled with grease at the time of assembly when desired. Normally the plastic bushings need to be lubricated only when the brakes are relined. However, in cases where severe service conditions prevail a lubrication channel 46 to receive a lubrication fitting (not shown) may be provided in the spider boss 14 to lubricate the bearing assembly. When the lubrication fitting is provided, an air vent hole 48 will also be provided, to prevent air lock. The opening 48 preferably runs longitudinally from an outer cavity 32 toward the outer end of the bushing 24 as shown in FIGURES 3 and 4.

The internal slots or grooves 36 and 38 do not extend beyond the O-ring recess 40 since foreign matter might enter the assembly and destroy the O-ring seals at that point. Accordingly it has been found necessary to slightly enlarge the internal diameter of the bushing 24 at the section indicated at 50 (FIGURE 4) in front of the O-ring seals 42 to prevent seizing on the camshaft 18.

Thus, there has been provided a novel spider camshaft bushing of non-metallic plastic material which has an extended service life and requires minimum maintenance as compared with prior metallic antifriction bearings or plain bushings.

The self-sealing feature as provided in the present invention eliminates the requirement for additional felt seals formerly employed and effectively retains the lubricant in the spider housing where it is important to prevent lubricant from leaking into the brake drum and equally effectively prevents the entry of foreign matter into the journal assembly.

The plastic material used such as Lexan or Delrin, can be easily molded and machined and is not subject to appreciable wear nor does it Brinell or otherwise damage the bearing surface of the camshaft. These novel bushings can be operated, in some instances, equally well without any lubrication.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A bearing assembly for rotatably mounting a shaft in a support having a through bore provided with counterbored ends comprising a pair of identical bushings made of tough machinable plastic, each bushing having an elongated annular body portion having an inner surface closely surrounding in bearing fit the external surface of said shaft and an external surface closely fitting the surface of said bore, the counterbores in said support ends having cylindrical peripheral walls and each said bushing having an enlarged end portion disposed within the associated counterbore, said bushing end portions each having a periphery in closely fitting holding engagement with the associated counterbore wall, outer O-ring seals carried by said enlarged sections and sealingly engaging the peripheral wall of said counterbore, and inner O-ring seals carried by said bushing and sealingly engaging said shaft.

2. In combination with a vehicle brake camshaft support, a camshaft means forming an aperture in said support to receive said camshaft having counterbored inner and outer ends, a pair of identical bushings made of tough machinable plastic inserted endwise within said aperture and terminating short of each other within said aperture to provide a space therebetween, said bushings having externally flanged outer ends closely fitting into said counterbores, resilient O-ring seals mounted on said bushings adjacent the inner sides of said flanged ends to provide outer seals within said counterbores, and inner resilient O-ring seals inserted within said bushings adjacent said flanged ends to provide inner seals between said camshaft and said bushings, said flanged bushing ends in cooperation with said counterbores preventing axial creeping of said bushings inwardly of said apertures and protecting said O-ring seals.

3. The combination according to claim 2 wherein said support is provided with a grease fitting adapted to inject lubricant directly into said space within said aperture.

4. In the combination according to claim 3 wherein said bushings are provided with outer longitudinal surface cavities terminating short of said flanged ends adapted to receive and retain lubricant and one or more holes extends from the outside axially through the flanged ends and connecting with said surface cavities to provide air venting therefor.

5. An integral plastic bushing assembly for a brake camshaft comprising an elongated main body portion having cylindrical inner and outer surfaces and terminating at one end in an annular flange extending radially outwardly from said outer surface, said outer surface being circumferentially smooth and continuous in a narrow region adjacent said flange but fluted longitudinally between said region and the other end of the bushing, said smooth surface region coacting with the adjacent side of said flange to mount an external O-ring seal when the bushing is mounted in a rigid support, an annular groove in said inner surface radially inwardly of said flange for receiving a second resilient O-ring seal, and a longitudinal lubricant receiving recess in said inner surface extending from the open end of said bushing opposite the flange to terminate adjacent said inner surface annular groove, said recess permitting expansion and contraction of the inner cylindrical surface without substantial deformation.

6. In the bushing assembly defined in claim 5, an air vent passage formed longitudinally through said annular flanged end of the body portion and opening at one end into one of said fluted portions.

7. Means for rockably mounting a brake camshaft comprising a relatively stationary tubular support having a through bore, a camshaft of smaller diameter than said bore extending through said bore to project therefrom at opposite ends, enlarged counterbores in said support at opposite ends of said bore, a pair of similar axially fixed bushings of tough machinable plastic inserted endwise within said bore at opposite ends and terminating short of each other within said bore to provide a lubricant containing space therebetween surrounding the shaft, said bushings having cylindrical smooth internal surfaces closely surrounding corresponding cylindrical shaft surfaces and having at their outer ends radially outwardly extending flanges disposed in said counterbores, and inner and outer flexible lubricant retaining sealing means disposed respectively between the shaft and said flanged end of each bushing and between said bushing end flanges and said counterbores, said sealing means being compressed to operative condition when said bushings are inserted endwise into said bore sufficiently to dispose their flanged ends within said counterbores.

References Cited in the file of this patent
UNITED STATES PATENTS

| | | |
|---|---|---|
| 1,701,819 | Moler | Feb. 12, 1929 |
| 2,512,148 | Gaines | June 20, 1950 |
| 2,647,721 | Volpin | Aug. 4, 1953 |
| 2,851,316 | Thomson | Sept. 9, 1958 |
| 2,872,217 | May | Feb. 3, 1959 |
| 2,892,662 | Scheel | June 30, 1959 |
| 2,913,284 | Zankl | Nov. 17, 1959 |
| 2,981,573 | Reuter | Apr. 25, 1961 |